United States Patent
Okitsu

[11] Patent Number: 5,793,384
[45] Date of Patent: Aug. 11, 1998

[54] IMAGE DECODER WITH BUS ARBITRATION CIRCUIT

[75] Inventor: Hiromi Okitsu, Hamamatsu, Japan

[73] Assignee: Yamaha Corporation, Hamamatsu, Japan

[21] Appl. No.: 596,737

[22] Filed: Feb. 5, 1996

[30] Foreign Application Priority Data

Feb. 9, 1995 [JP] Japan ................................. 7-044927

[51] Int. Cl.[6] ........................................ G06F 13/00
[52] U.S. Cl. .................................... 345/511; 345/501
[58] Field of Search ............................. 382/232, 233; 395/511, 501, 512

[56] References Cited

U.S. PATENT DOCUMENTS

| | | | |
|---|---|---|---|
| 4,941,193 | 7/1990 | Barnsley et al. | 382/232 |
| 5,369,744 | 11/1994 | Fukushima et al. | 395/511 |
| 5,555,322 | 9/1996 | Terai et al. | 382/232 |
| 5,566,254 | 10/1996 | Murata et al. | 382/304 |

Primary Examiner—Raymond J. Bayerl
Assistant Examiner—Cao H. Nguyen
Attorney, Agent, or Firm—Pillsbury Madison & Sutro LLP

[57] ABSTRACT

An image decoder has a bus arbitrating circuit for controlling the use of the bus by any one of input bit stream buffer control circuit, decoding circuit, and image output control circuit. The bus arbitrating circuit controls the bus to provide the image output control means with the highest priority to use the bus without interruption to access the memory at predetermined time intervals. After the completion of the memory access by the image output control means, the bus arbitrating circuit detects whether a request for access to the memory is made by the input bit stream buffer control circuit, and when the request is made, permits the input bit stream buffer control circuit to use the bus. When both the image output control circuit and input bit stream buffer control circuit are not using the bus, permits the decoding means to use the bus to access the memory.

5 Claims, 3 Drawing Sheets

IMAGE DECODER WITH BUS ARBITRATION CIRCUIT

BACKGROUND OF THE INVENTION

1. Field of the Invention

This invention relates to an image decoder with a bus arbitration circuit for decoding image data made up of variable length codes, such as a Moving Picture Coding Experts Group (NPEG).

2. Related Art

Improvement in digital communications networks or data memory media has standardized a variety of digital image compression systems (such as MPEG1 and MPEG2). For example, in MPEG1, a coded bit stream consists of six (6) kinds of layers—a sequence layer, GOP (Group of Pictures) layer, picture layer, slide layer, macro-block layer, and block layer. A coded bit stream in MPEG2 has a layer structure that is substantially similar to MPEG1. However, the GOP layer in MPEG2 is optional, and the arrangement of the picture layer need not be particularly specified. In a particular picture image of NPEG, screen data for one screen image is coded according to the screen data for previous and subsequent screens. In other words, the screen data for one screen image do not contain information sufficient to decode the screen data. Therefore, a random access of a group of picture (GOP) images, including several screen image data as references, is required.

The term "GOP" denotes a combination of three kinds of pictures—I (Intra), P Predictive) and B (Bidirectionally predictive) pictures. Each picture corresponds to data on one frame of image. I (Intra) picture corresponds to an in-frame coded image. P (Predictive) picture corresponds to an inter-frame forwardly predictive coded image. B (Bidirectionally predictive) picture corresponds to an inter-frame bidirectionally predictive coded image. A bit stream for each picture frame provided to the image decoder is subjected to a variety of image processing algorithms, such as a VLC (variable length code) decoding, reverse quantization, reverse DCT (discrete cosine transform) and inter-frame motion compensation. In MPEG2, the image data may be processed for every field, instead of every frame.

An MPEG bit stream is of variable length code. Hence, the amount of data in each frame, for the purpose of decoding, is not constant. For instance, the I picture formed by in-frame coding has a larger number of codes per frame than the P or B picture formed by inter-frame coding which is based on a motion vector compensation. Even in the same type of pictures, the amount of codes per frame depends on the image motion speed or the monotonousness in image arrangement. Hence, when an MPEG bit stream is transmitted through a constant-rate data transmission line, such as in a communication circuit, the image decoder has a data rate adjusting input bit stream buffer for storing an input bit stream (hereinafter referred to as an "input BS"). In addition, for bidirectional inter-frame motion compensation, the image decoder has a frame memory for storing decoded images corresponding to two frames, and a display buffer for storing decoded output images.

In the above described image decoder, a main processing portion is provided as an image decoding integrated circuit (in the form of an LSI circuit). A DRAM (Dynamic Random Access Memory) is externally connected to the image decoding integrated circuit, and an input BS buffer, a frame memory, and a display buffer are built into the DRAM. In the above system, through a bus between the image decoding integrated circuit and the external DRAM, access to the DRAM is carried out for writing and/or reading of an input BS, for reading of reference images for inter-frame motion compensation decoding, and for writing of decoded images. Hence, a bus arbiter is built into the image decoding integrated circuit to control the data traffic on the bus.

In the arbitration system of the bus arbiter, a first priority is given to the reading of decoded images, the writing of input BS to the input BS buffer, and the reading therefrom. A second priority is given to the writing of decoded images. A third priority is given to the reading of reference images. When a plurality of access requests having the first priority occur at the same time, the bus arbiter gives those circuits issuing the request an equal access to the bus by time domain multiplexing.

The image decoder employing the above-described bus arbitrating system suffers from the following problem. When accessing the input BS buffer, a request to use the bus is made to read the decoded image. As a result, it becomes difficult to continuously output the decoded image with no interruptions. This difficulty may be solved by suspending the access to the input BS buffer, for example, by transferring the use of the bus to another circuit in need of the bus. However, this method gives rise to another problem. The process of suspension/resumption must be performed, not only to access the input BS buffer, but also to access the DRAM during the decoding process, which results in a longer processing overhead period. Particularly when a DRAM is employed as an external memory and the image decoder operates in a high-speed mode, the time of resumption RAS (row address strobe) and CAS (column address strobe) must be repeatedly given. In addition, the image decoder may require additional control circuits to control the strobe signals.

SUMMARY OF THE DISCLOSURE

In view of the foregoing, an object of the invention is to provide an image decoder that simplifies the bus arbitration to allow continuous output of decoded images with no interruptions.

The foregoing object of the invention has been achieved by an image decoder comprising an image decoding integrated circuit, and a memory connected to the image decoding integrated circuit through a bus. The memory portion of the image decoding integrated circuit has an input bit stream buffer for storing input bit streams and an image memory region for storing a decoded image from the image decoding integrated circuit. The image decoding integrated circuit includes an input bit stream buffer control circuit, a decoding circuit, an image output control circuit and a bus arbitrating circuit. The input bit stream buffer control circuit writes an input bit stream into the input bit stream buffers through an input buffer, and reads the input bit stream from the input bit stream buffer. The decoding circuit decodes the input bit stream from the input bit stream buffer control circuit, and reads the decoded image, as a reference image, from the image memory region, to perform a decoding treatment, including a inter-frame motion compensation, to form a decoded image. The decoding circuit then writes the decoded image into the image memory region. The image output control circuits reads the decoded image from the image memory region at predetermined intervals and outputs the decoded image. The bus arbitrating circuit controls the use of the bus between the memory and the above-described circuits.

According to the preferred embodiment of the invention, the bus arbitrating circuit permits the image output control circuit to use the bus at predetermined time intervals, giving a top priority to the image output control circuit to access the memory. Immediately after the image output control circuit accesses the memory, the bus arbitrating circuit detects, by polling, whether or not a request to access the memory is made by the input bit stream buffer control circuit. When such a request is made, the bus arbitrating circuit permits the input bit stream buffer control circuit to use the bus. When neither the image output control circuit nor input bit stream buffer control circuit uses the bus, the bus arbitrating circuit permits the decoding circuit to use the bus.

The input bit stream includes compressed data and has a lower bit rate (approximately 1/100) than the decoded image. Hence, even with the polling at constant time intervals, a small input buffer may be sufficient to store the input bit stream. The time remaining can be used (assigned) for reading a reference image from the memory into the decoding circuits and for writing the decoded image to the memory to maintain a highly accurate decoding process.

According to the preferred embodiment of the present invention, the bus arbitrating circuit is designed so that the suspension and resumption of the memory access occur with only the decoding circuit, and not with input BS buffer controller means and the image output control means.

Other features and advantages of the invention will become apparent from the following detailed description, taken in conjunction with the accompanying drawings which illustrate, by way of example, various features of embodiments of the invention.

BRIEF DESCRIPTION OF THE DRAWING(S)

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
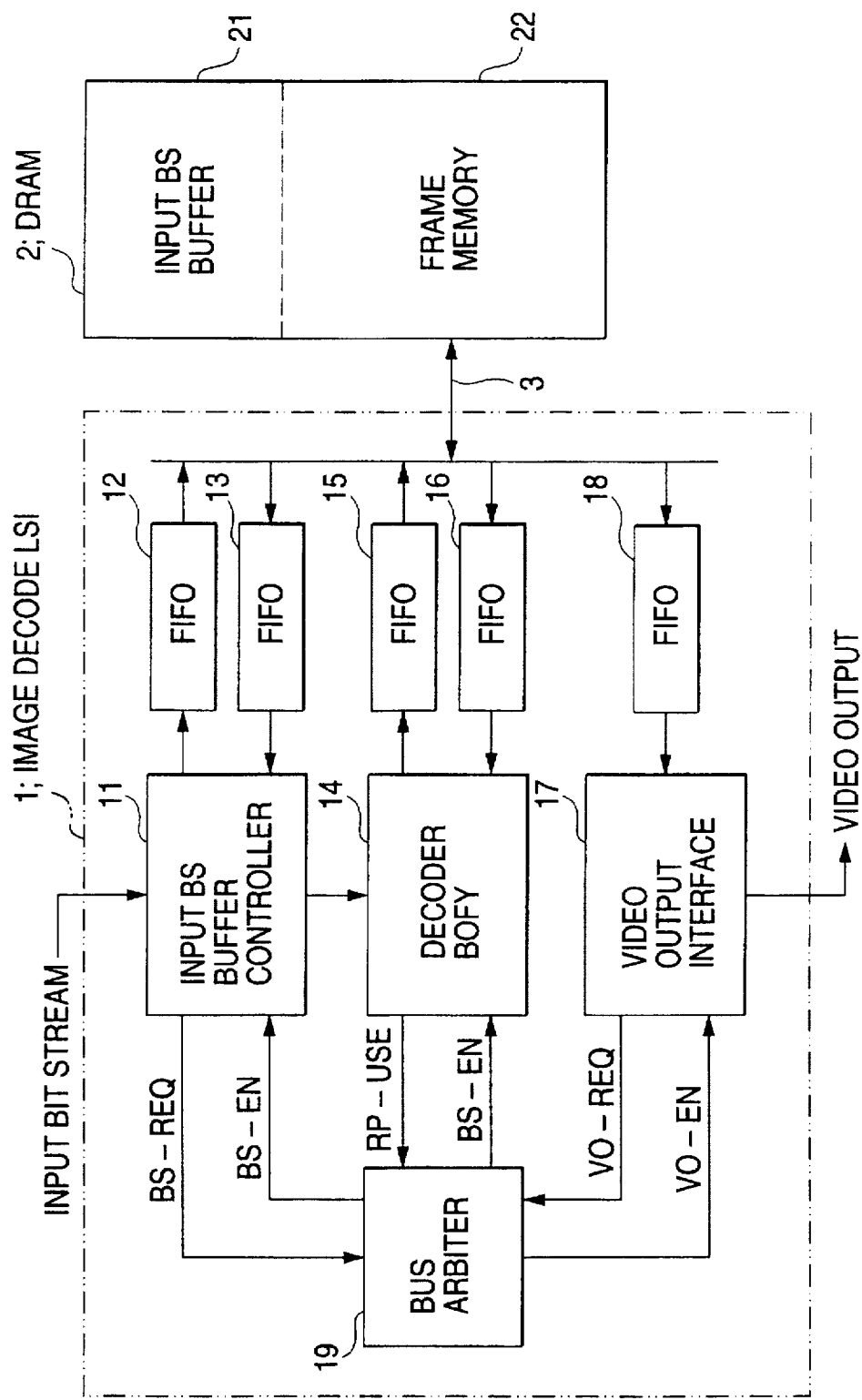
FIG. 1 is a block diagram of an image decoder according to a preferred embodiment of the invention.

A preferred embodiment of the invention will be described with reference to the accompanying drawings. FIG. 1 is a block diagram of an image decoder using MPEG 1 & 2 formats according to an embodiment of the invention. The image decoder is made up of an image decoder LSI 1, a DRAM 2 externally placed from the image decoder LSI 1, and a bus 3 connecting the image decoder LSI 1 and the DRAM 2.

The DRAM 2 has an image memory region and an input BS buffer 21 for storing an input BS for rate adjustment. The image memory region has a frame buffer for storing a reference image, which is used for inter-frame motion compensation prediction, and a frame memory 22 which serves as a display buffer for storing and outputting a decoded display image.

The operation of the image decoder LSI 1 according to the preferred embodiment will now be discussed. In the image decoder LSI 1, an input bit stream is continuously applied to an input BS buffer controller 11 at a predetermined rate. The input bit stream is then stored in an FIFO (First-in First-out) buffer 12 under the control of the controller 11 and is then written into the input BS buffer 21. The input BS is read from the input BS buffer 21 under the control of the input BS buffer controller 11, and is supplied to a decoder circuit 14 through an FIFO buffer 13 and the input BS buffer controller 11.

In the decoder circuit 14, the input BS (supplied for each picture) received from the input BS buffer controller 11 is subjected to a variety of image processing algorithms, such as a VLC (variable length code) decoding, reverse quantization, and reverse DCT (discrete cosine transformation). The input BS is then subjected to a motion compensation according to the picture type to decode the image frame. During the motion compensation, the decoder circuit 14 reads a decoded image, as a reference image, stored in the frame memory 22. The reference image, which is in the form of macro-blocks or blocks, is bit-shifted according to a motion vector and is provided to the decoder circuit 14 through a FIFO buffer 16. The decoded image provided in macro-blocks or blocks is provided to the frame memory 22 through a FIFO buffer 15. The decoded image written into the frame memory 22 is read out under the control of the a video output interface 17, and is outputted as a video output signal through a FIFO buffer 18 and the video output interface 17.

The operation of bus arbiter 19 will now be described. The use of the bus 3 by the input BS buffer controller 11, the decoder body 14, and the video output interface 17 is controlled by a bus arbiter 19. More specifically, the control of the bus 3 by the bus arbiter 19 is as follows:

(1) The video output interface 17 has the highest priority in the use of the bus. When a video output bus request signal VO-REQ is generated, which the video output interface 17 outputs at predetermined intervals for a predetermined period of time, a video output bus use permit signal VO-EN from the bus arbiter 9 is provided unconditionally.

(2) The right to use the bus is given to the input BS buffer controller 11 through a polling by the bus arbiter 19 immediately after the video output interface 17 relinquishes the bus 3. In other words, immediately after the video output interface 17 accesses the DRAM 2, the input BS buffer controller 11 initiates a polling for an input BS-I/F bus request signal BS-REQ. If the BS-REQ signal is active, the bus arbiter 19 provides the BS-I/F bus use permit signal BS-EN to the input BS buffer controller 11.

(3) The right to use the bus is given to the decoder circuit 14 only when neither the video output interface 17 nor input BS buffer controller 11 uses the bus. When this condition is met, a reference image I/F bus use permit signal RP-EN is provided to the decoder circuit 14. The decoder circuit 14 then provides a reference image I/F bus use notify signal RP-USE to the bus arbiter 19.

Figure 2:
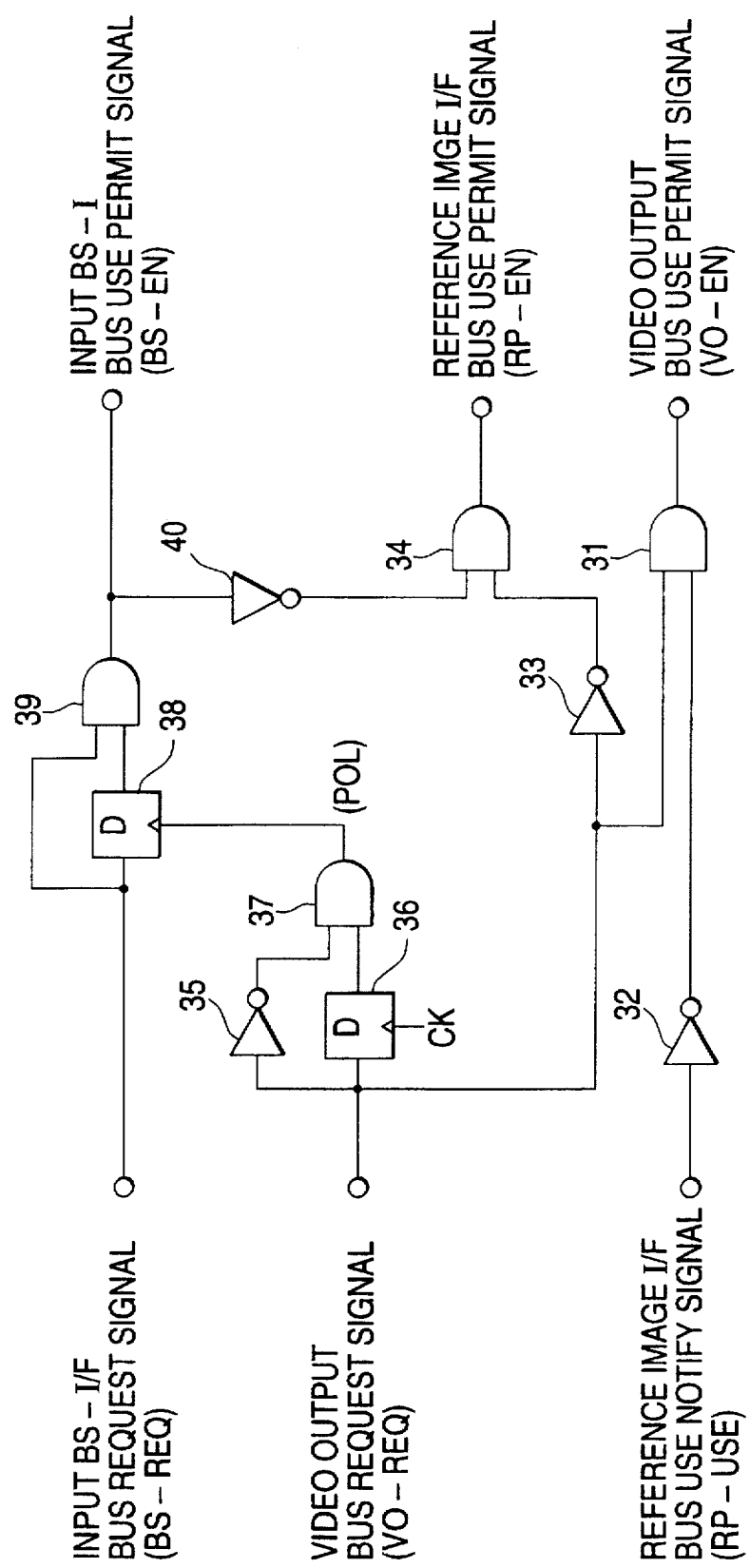
FIG. 2 is a block diagrams of a bus arbiter in the image decoder.
Figure 3:
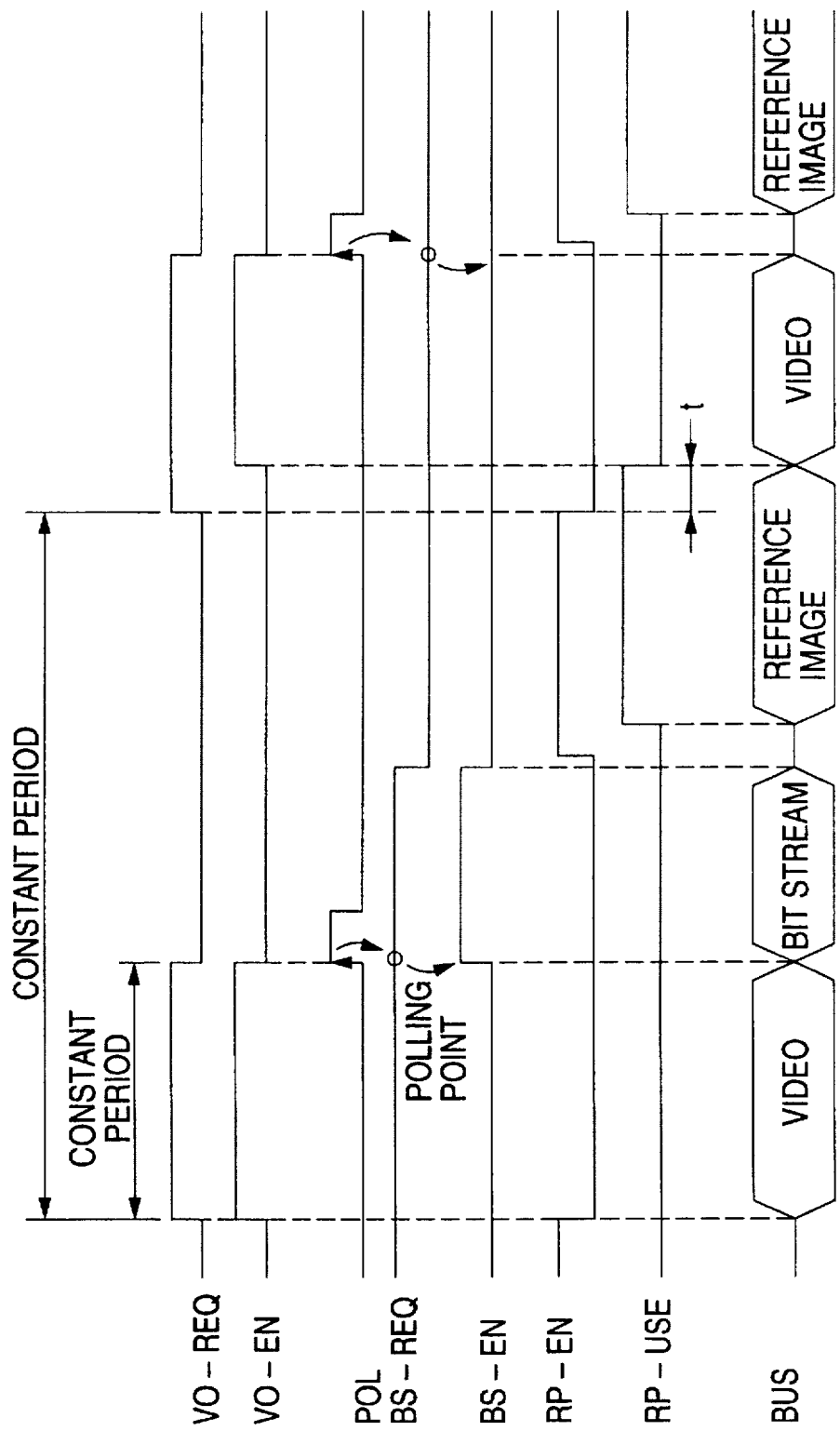
FIG. 3 is time lines of input and output signals of the bus arbiter shown in FIG. 1.

FIG. 2 shows a block diagram of the bus arbiter 19, and FIG. 3 shows time lines of the input and output signals of the bus arbiter 19. The video output interface 17, and the input BS buffer controller 11 make the VO-REQ signal and the BS-REQ signal active when it is necessary to access the DRAM 2, and make those signals inactive after the bus is released. The decoder circuit 14, upon negation of the RP-EN signal, suspends the DRAM 2 access for a period of time, releases the bus, and makes the RP-EN signal inactive.

The video output interface 17 outputs the VO-REQ signal which becomes active for a predetermined period of time. The VO-REQ signal is applied to an AND gate 31, to which the RP-USE signal is applied through an inverter 32, so that the AND gate 31 outputs the VO-EN signal. When the VO-REQ signal becomes active, the RP-EN signal provided through an inverter 33 and an AND gate 34 is made inactive. Therefore, the RP-USE signal is made inactive within a delay time of τ. The delay time τ is the time for the decoder body 14 to suspend the accessing of the DRAM 2 and to release the bus. Thus, even if the decoder body 14 uses the bus 3, the reading of the display image at predetermined time intervals is carried out with top priority.

The VO-REQ signal is applied to an AND gate 37 through an inverter 35, while the same VO-REQ signal is applied to the AND gate 37 through a delay circuit. That is, the VO-REQ signal is applied to the AND gate 37 after being delayed as much as one clock pulse. The AND gate 37 outputs a pulse signal which is produced immediately after the VO-EN signal falls. This pulse signal is a polling signal POL. A latch circuit 38 latches the BS-REQ signal in response to the polling signal POL. The outputs of the latch circuit 38 and the BS-REQ signal are both applied to an AND gate 39. The AND gate 39 outputs the BS-EN signal which becomes active only for the period of time that the BS-REQ signal is active. The above configuration provides an input BS writing/reading operation with respect to the DRAM 2 with the polling signal POL provided immediately after the video output. Even if the BS-EN signal is active, the RP-EN signal from the AND gate 34 becomes inactive due to an inverter 40.

In the case where the image decoder is connected to a real time data source, such as a communication line, the input BS applied to the image decode LSI 1 must be written in the input BS buffer 21 of the DRAM 2 without interruption. Hence, the access to the input BS must have a high priority. Because the access period is constant, the FIFO buffer 12 capacity can be determined from the bit rate of the input BS. Moreover, because the input BS rate is lower than that of the video output, the polling may be made within one period of the VO-REQ signal, as shown in FIG. 3. Thus, it is unnecessary to have a large capacity FIFO buffers 12 and 13.

The data rate of the decoder circuit 14 with respect to the DRAM 2 is relatively high, and not constant. However, since it is not always necessary that the access by the decoder circuit 14 is performed in real time, the use of the bus 3 by the decoder circuit 14 is at a low priority. Thus, by the above-described bus use arbitration, the overhead caused by the suspension and resumption of access is decreased. In other words, a high DRAM access data rate can be achieved by the image decoder circuit.

In an alternative embodiment of the present invention, the DRAM, which is used as an external memory to the LSI 1, may be substituted by another type of memory, such as an SDRAM (Synchronous DRAM).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image decoder for decoding an input bit stream, the image decoder comprising:

a memory having an input bit stream buffer for storing the input bit stream;

an image memory region for storing a decoded image; and an image decoding circuit coupled to the memory through a bus, the image decoding circuit having input bit stream buffer control means coupled to the bus for writing and reading the input bit stream to and from the input bit stream buffer;

decoding means coupled to the bus for reading the input bit stream from the input bit stream buffer to generate decoded image data, and for writing the decoded image data in the image memory region;

image output control means coupled to the bus for reading the decoded image data from the image memory region and outputting the decoded image data; and bus arbitrating means coupled to at least one of the input bit stream buffer control means, the decoding means and the image output control means for controlling use of the bus by any one of the input bit stream buffer control means, decoding means, and image output control means, wherein the bus arbitrating means controls the bus to provide the image output control means with the highest priority to use the bus without interruption to access the memory at predetermined time intervals, and after the completion of the memory access by the image output control means, detects whether a request for access to the memory is made by the input bit stream buffer control means, and when the request is made, permits the input bit stream buffer control means to use the bus, and when both the image output control means and input bit stream buffer control means are not using the bus, permits the decoding means to use the bus to access the memory.

2. The image decoder according to claim 1, wherein the decoding means reads the decoded image, as a reference image, from the image memory region, and based on the reference image, decodes the input bit stream from the input bit stream buffer control means using an inter-frame motion compensation.

3. An image decoding circuit for decoding an input bit stream, operable with a memory device having an input bit stream buffer and an image memory region, the image decoding circuit coupled to the memory device via a bus, the image decoding circuit comprising:

input bit stream buffer control means coupled to the bus for writing and reading the input bit stream to and from the input bit stream buffer;

decoding means coupled to the bus for reading the input bit stream from the input bit stream buffer to generate decoded image data, and for writing the decoded image data in the image memory region;

image output control means coupled to the bus for reading the decoded image data from the image memory region and outputting the decoded image data; and bus arbitrating means coupled to at least one of the input bit stream buffer control means, the decoding means and the image output control means for controlling use of the bus by any one of the input bit stream buffer control means, decoding means, and image output control means, wherein the bus arbitrating means controls the bus to provide the image output control means with the highest priority to use the bus without interruption to access the memory at predetermined time intervals, and after the completion of the memory access by the image output control means, detects whether a request for access to the memory is made by the input bit stream buffer control means, and when the request is made, permits the input bit stream buffer control means to use the bus, and when both the image output control means and input bit stream buffer control means are not using the bus, permits the decoding means to use the bus to access the memory.

4. An image decoding circuit according to claim 3, wherein the bus arbitrating means includes:

a first input signal generated from the image output control means;

a second input signal generated from the input bit stream buffer control means;

a third input signal generated from the decoding means;

a first output signal provided to the image output control means;

a second output signal provided to the input bit stream control means: and a third output signal provided to the decoding means, wherein when the first input signal is activated, the first output signal is accordingly activated for the image output control means to access the bus without interruption and the second and the third output signals are deactivated, when the second input signal is activated, the second output signal is activated for the input bit stream buffer control means to access the bus only when the first input signal has been deactivated, and when the third input signal is activated, the third output signal is activated for the decoding means to access the bus only when both the first and the second input signals have been deactivated.

5. An image decoding circuit for decoding an input bit signal, operable with a memory device having an input bit stream buffer and an image memory, the image decoding circuit coupled to the memory device via a bus, the image decoding circuit comprising:

an input bit stream buffer control unit coupled to the bus for writing and reading the input bit signal to and from the input bit stream buffer;

a decoding unit coupled to the bus for reading the input bit signal from the input bit stream buffer to generate decoded image data, and for writing the decoded image data in the image memory;

an image output control unit coupled to the bus for reading the decoded image data from the image memory and outputting the decoded image data; and a bus arbitrating unit coupled to at least one of the input bit stream buffer control means, the decoding means and the image output control means for controlling use of the bus by any one of the input bit stream buffer control unit, decoding unit, and image output control unit, wherein the bus arbitrating means controls the bus to provide the image output control unit with the highest priority to use the bus without interruption to access the memory at predetermined time intervals, and after the completion of the memory access by the image output control unit, detects whether a request for access to the memory is made by the input bit stream buffer control unit, and when the request is made, permits the input bit stream buffer control unit to use the bus, and when both the image output control unit and input bit stream buffer control unit are not using the bus, permits the decoding unit to use the bus to access the memory.

* * * * *